United States Patent
Li et al.

(10) Patent No.: US 11,928,457 B2
(45) Date of Patent: Mar. 12, 2024

(54) SERVER OF BATTERY SWAPPING STATION, CHARGING METHOD AND SYSTEM FOR BATTERY, DEVICE AND MEDIUM

(71) Applicant: Contemporary Amperex Technology Co., Limited, Ningde (CN)

(72) Inventors: Zhanliang Li, Ningde (CN); Zhimin Dan, Ningde (CN); Yu Yan, Ningde (CN); Miaomiao Zhang, Ningde (CN); Zhenhui Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 127 days.

(21) Appl. No.: 17/704,047

(22) Filed: Mar. 25, 2022

(65) Prior Publication Data
US 2023/0063433 A1 Mar. 2, 2023

Related U.S. Application Data

(63) Continuation of application No. PCT/CN2021/115814, filed on Aug. 31, 2021.

(51) Int. Cl.
*G06F 8/60* (2018.01)
*B60L 53/68* (2019.01)
*G06F 8/65* (2018.01)

(52) U.S. Cl.
CPC ............... *G06F 8/65* (2013.01); *B60L 53/68* (2019.02)

(58) Field of Classification Search
CPC .................... G06F 8/65; B60L 53/68
See application file for complete search history.

(56) References Cited

U.S. PATENT DOCUMENTS

2016/0114686 A1   4/2016  Beattie, Jr. et al.
2019/0207911 A1 *  7/2019  Wiener .................... G06F 8/65
(Continued)

FOREIGN PATENT DOCUMENTS

CN    106775636 A    5/2017
CN    109617158 A    4/2019
(Continued)

OTHER PUBLICATIONS

PCT International Search Report for PCT/CN2021/115814, dated Nov. 8, 2021, 14 pages.
(Continued)

*Primary Examiner* — Hanh Thi-Minh Bui
(74) *Attorney, Agent, or Firm* — East IP P.C.

(57) ABSTRACT

Embodiments of the present application provide a server of a battery swapping station, a charging method and system for a battery, a device and a medium. The method is applied to a server of a battery swapping station, and the method includes: acquiring version information of a first software version after a vehicle mounted with a power battery arrives at the battery swapping station, wherein the first software version is a software version of a first battery management unit of the power battery; controlling, under a condition that the version information of the first software version is lower than version information of a second software version stored in the server, a second battery management unit of the battery swapping station to update the first software version of the first battery management unit to the second software version.

18 Claims, 5 Drawing Sheets

(56) References Cited

U.S. PATENT DOCUMENTS

2019/0384589 A1* 12/2019 Du .......................... G06F 8/65
2020/0059400 A1* 2/2020 Oakley .................... G06F 8/65

FOREIGN PATENT DOCUMENTS

| | | |
|---|---|---|
| CN | 109733245 A | 5/2019 |
| CN | 111488160 A | 8/2020 |
| CN | 111845398 A | 10/2020 |
| CN | 113110855 A | 7/2021 |
| JP | 2020013444 A | 1/2020 |
| JP | 2020182371 A | 11/2020 |
| KR | 20110004292 A | 1/2011 |
| KR | 20150033240 A | 4/2015 |
| WO | 2015148147 A1 | 10/2015 |
| WO | 2020111243 A1 | 6/2020 |

OTHER PUBLICATIONS

The extended European search report for European Application No. 21827813.3, dated Jun. 22, 2022, 7 pages.
The First Office Action for KR Application No. 10-2021-7034873, dated Aug. 24, 2023, 8 pages.
The First Office Action for Japanese Application No. 2021-560200, dated Nov. 7, 2023, 7 pages.

* cited by examiner

SERVER OF BATTERY SWAPPING STATION, CHARGING METHOD AND SYSTEM FOR BATTERY, DEVICE AND MEDIUM

This application is a continuation of International Application No. PCT/CN2021/115814 filed on Aug. 31, 2021, which is incorporated herein by reference in its entirety.

TECHNICAL FIELD

The present application relates to a technical field of battery swapping, and in particular to a server of a battery swapping station, a charging method and system for a battery, a device and a medium.

BACKGROUND

With the development of electric vehicles, the battery swapping technology for the vehicles has become one of the development ways of the battery technology. In the battery swapping technology, after removing a power battery of a vehicle entered into a battery swapping station and taking out another power battery from the battery swapping station to install on the vehicle, the removed power battery is put into a charging compartment for charging.

However, the duration of the entire charging process of the power battery in the battery swapping station is relatively long, which affects the user experience.

SUMMARY

Embodiments of the present application provide a server of a battery swapping station, a charging method and system for a battery, a device and a medium.

In a first aspect, an embodiment of the present application provides a charging method for a power battery, wherein the method is applied to a server of a battery swapping station, and the method includes:
  acquiring version information of a first software version after a vehicle mounted with a power battery arrives at the battery swapping station, wherein the first software version is a software version of a first battery management unit of the power battery;
  controlling, under a condition that the version information of the first software version is lower than version information of a second software version stored in the server, a second battery management unit of the battery swapping station to update the first software version of the first battery management unit to the second software version, so as to charge the power battery based on the second software version.

In a second aspect, an embodiment of the present application provides a server of a battery swapping station, including:
  a version acquisition module configured to acquire version information of a first software version after a vehicle mounted with a power battery arrives at the battery swapping station, wherein the first software version is a software version of a first battery management unit of the power battery;
  a control module configured to control, under a condition that the version information of the first software version is lower than version information of a second software version stored in the server, a second battery management unit of the battery swapping station to update the first software version of the first battery management unit to the second software version, so as to charge the power battery based on the second software version.

In a third aspect, an embodiment of the present application provides a charging system for a power battery, including:
  a first battery management unit;
  a second battery management unit; and
  the server provided by the second aspect or any of the optional embodiments in the second aspect.

In a fourth aspect, an embodiment of the present application provides a charging device for a power battery, including:
  a processor and a memory storing computer program instructions;
  wherein the processor, when reads and executes the computer program instructions, implements the charging method for the power battery provided by the first aspect or any of the optional embodiments in the first aspect.

In a fifth aspect, an embodiment of the present application provides a computer storage medium having computer program instructions stored thereon, wherein the computer program instructions, when executed by a processor, implement the charging method for the power battery provided by the first aspect or any of the optional embodiments in the first aspect.

BRIEF DESCRIPTION OF THE DRAWINGS

In order to more clearly illustrate the technical solutions of the embodiments of the present application, the drawings to be used in the embodiments of the present application will be briefly introduced below. For those of ordinary skill in the art, other drawings can be obtained based on these drawings without inventive effort.

DETAILED DESCRIPTION

Figure 1:
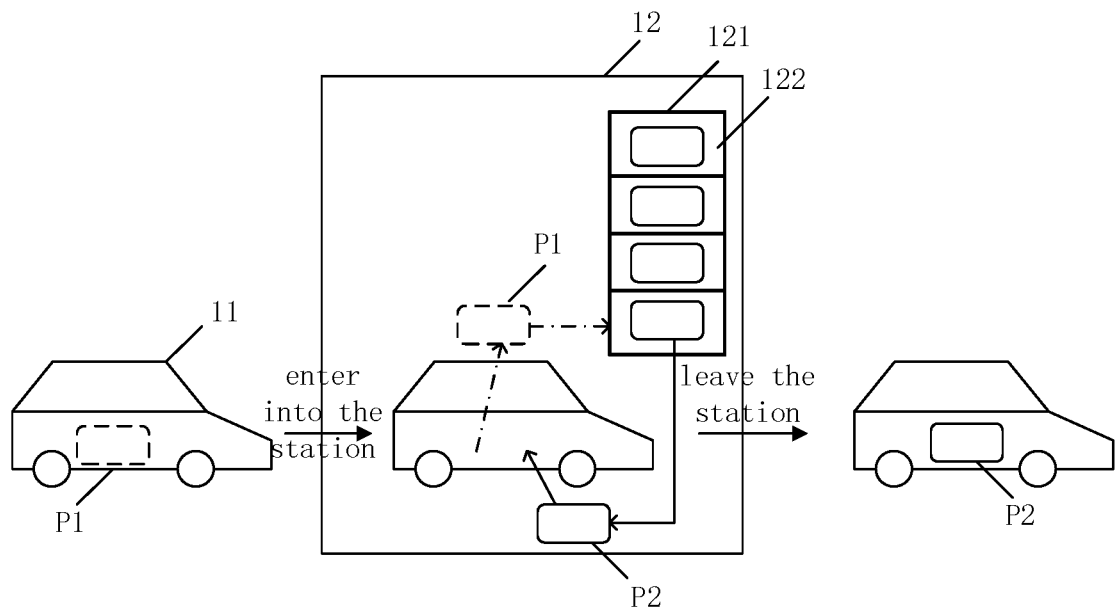
FIG. 1 is a schematic diagram of an exemplary scenario for battery swapping provided by an embodiment of the present application.

The implementations of the present application are described in further detail below with reference to the accompanying drawings and embodiments. The detailed description and drawings for the following embodiments are used to exemplarily illustrate the principle of the present application, but cannot be used to limit the scope of the present application. That is, the present application is not limited to the described embodiments.

In the description of the present application, it should be noted that, unless otherwise stated, "multiple" means two or more. Further, the orientations or positional relationships indicated by the terms "upper", "lower", "left", "right", "inside" and/or "outside" are only used for the convenience of describing the present application and simplifying the description, rather than indicating or implying that the device or element referred to must have a specific orientation or must be constructed and operated in a specific orientation, which therefore cannot be understood as a limitation of the present application. In addition, the terms "first", "second", "third" and the like are only used for descriptive purposes, and cannot be understood as indicating or implying relative importance. "Vertical" is not strictly vertical, but within an allowable range of error. "Parallel" is not strictly parallel, but within an allowable range of error.

The orientation words appearing in the following description are all directions shown in the figures, and do not limit the specific structure of the present application. In the description of the present application, it should also be noted that, unless otherwise clearly defined and limited, the terms "installed", "linked", and "connected" should be understood in a broad sense. For example, it may be a fixed connection, a detachable connection, or an integral connection; it may be a direct connection, or an indirect connection through an intermediate medium. For those of ordinary skill in the art, the specific meaning of the above-mentioned terms in the present application can be understood according to specific circumstances.

With the rapid development of new energy technologies, various technologies serving the new energy have also been greatly improved. Considering the difficulty of charging, the slow charging rate, and the limited battery life, the battery swapping technology for new energy vehicles came into being.

The battery swapping technology adopts a way of separating the vehicle and the battery, which can provide a battery swapping service for the vehicle through a battery swapping station. That is, the battery can be quickly removed from or installed on the vehicle.

However, at the present stage, the duration of the entire charging process of the power battery in the battery swapping station is relatively long, which affects the user experience. Exemplarily, in a specific application scenario where the number of the battery swapping stations and the number of the available batteries in the battery swapping station are not enough to meet the needs of the users, the long charging time of the power battery will result in low efficiency of the battery swapping station, thereby affecting the user experience.

Therefore, there is a need for a technical solution that can improve the charging efficiency of the power battery.

Based on this, the embodiments of the present application provide a charging method and device for a power battery, a device and a medium, which can be applied to application scenarios of battery swapping for the vehicles. According to the charging scheme of the power battery provided by the embodiments of the present application, the charging efficiency of the power battery may be improved and the user experience may be improved.

In order to better understand the present application, before starting to introduce the vehicle control scheme provided by the embodiments of the present application, the embodiments of the present application firstly give specific explanations on the concepts such as a vehicle, a power battery, and a battery swapping station involved in the present application in turn.

(1) For the vehicle, the vehicle in the embodiments of the present application can be detachably connected to the battery. In some embodiments, the vehicle may be a vehicle such as a car or a truck that uses a power battery as a power source.

(2) For the power battery, the power battery in the embodiments of the present application may be a lithium ion battery, a lithium metal battery, a lead acid battery, a nickel cadmium battery, a nickel hydrogen battery, a lithium sulfur battery, a lithium air battery, or a sodium ion battery and the like, which is not limited here.

In terms of scale, the power battery may be a single battery cell, a battery module or a battery pack, which is not limited here.

In terms of application, the power battery may be used in an electric vehicle as a power source of the electric vehicle, so as to supply power to a motor of the electric vehicle. The battery may also supply power to other electrical devices in the electric vehicle, such as an onboard air conditioner, a car player and the like.

(3) For the battery swapping station, in the embodiments of the present application, the battery swapping station may refer to a place that provides a battery swapping service for vehicles. For example, the battery swapping station may be a fixed place, or a mobile place such as a mobile battery swapping vehicle, which is not limited in the embodiments of the present application.

After introducing the above concepts, in order to facilitate understanding, before specifically describing the charging scheme of the power battery provided in the embodiments of the present application, the following parts of the embodiments of the present application will firstly describe an exemplary scenario for battery swapping in detail.

FIG. 1 is a schematic diagram of an exemplary scenario for battery swapping provided by an embodiment of the present application. As shown in FIG. 1, a battery swapping station 12 may include a battery swapping cabinet 121. Here, the battery swapping cabinet 121 may include multiple charging compartments 122.

After a vehicle 11 installed with a power battery P1 enters into the battery swapping station 12, the battery swapping station 12 removes the power battery P1 from the vehicle 11 through a battery swapping device, takes out a power battery P2 from a charging compartment 122, and then installs the battery P2 on the vehicle 11. After that, the vehicle 11 installed with the power battery P2 can drive away from the battery swapping station 12. According to this battery swapping technology, the vehicle can be quickly replenished with energy within a few minutes or even tens of seconds, which improves the user experience.

In addition, for the removed power battery P1, it can be put into an idle charging compartment 122 for charging, so that the battery swapping station 12 can continue to provide the battery swapping service for other vehicles. After introducing the scenario for battery swapping, next, in order to facilitate understanding, before specifically describing the charging scheme of the power battery provided in the embodiments of the present application, the following parts of the embodiments of the present application will firstly describe a battery swapping system in detail.

Figure 2:
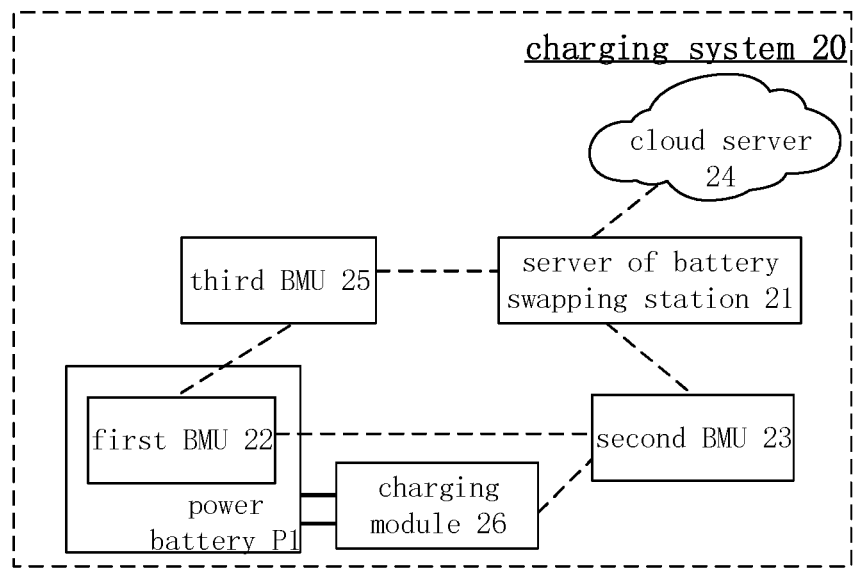
FIG. 2 is a system framework diagram of an exemplary charging system provided by an embodiment of the present application.

FIG. 2 is a system framework diagram of an exemplary charging system provided by an embodiment of the present application. As shown in FIG. 2, a charging system 20 may include a server 21 of the battery swapping station, a first battery management unit (Battery Management Unit, BMU) 22, and a second battery management unit BMU 23.

The server 21 of the battery swapping station is configured to control the battery swapping work for the battery swapping station. In an example, the server 21 of the battery swapping station may be implemented as a device with a control function, such as a computer.

The first BMU 22 is disposed inside the power battery and is configured to manage the battery.

The second BMU 23 is disposed in the battery swapping station, and may be disposed in the battery swapping cabinet for example. Specifically, the second BMU 23 can control the software update and charging process of the power battery P1.

In addition, continuing to refer to FIG. 2, the dotted lines between the components of the charging system 20 in FIG. 2 indicate that the components connected at both ends of the dotted line can communicate with each other.

Here, the server 21 of the battery swapping station may perform wired communication or wireless communication with the second BMU 23. For example, they may communicate via Ethernet.

Here, the second BMU 23 may perform wired communication or wireless communication with the first BMU 22. In an embodiment, the first BMU 22 may be connected to the second BMU 23 via a cable after entering into the charging compartment. In another embodiment, when the first BMU 22 enters into a communication coverage area of the second BMU 23, the first BMU 22 can perform wireless communication. For example, they may perform Bluetooth communication.

In addition, in some embodiments, continuing to refer to FIG. 2, in order to achieve unified scheduling and management of multiple battery swapping stations, the charging system 20 may further include a cloud server 24. The cloud server 24 can communicate with the server 21 of the battery swapping station.

In some embodiments, continuing to refer to FIG. 2, in order to reasonably control the electricity of the vehicle, the charging system 20 further includes a third BMU 25. Specifically, the third BMU 25 may be disposed in the vehicle body. In an embodiment, when multiple power batteries P1 are installed in the vehicle, the third BMU 25 may communicate with the multiple power batteries P1. Exemplarily, as the number of times of disassembly of the power battery P1 increases, the service life of the wired connection port will be affected. In order to improve the reliability of the connection between the power batteries and the vehicle, the third BMU 25 may be connected to the multiple power batteries P1 via a wireless communication connection, such as a Bluetooth communication connection.

In some embodiments, continuing to refer to FIG. 2, in order to charge the power batteries in the battery swapping station, the charging system 20 may further include a charging module 26. Specifically, the charging module 26 can charge the power battery P1 in the charging compartment under the control of the second BMU 23. In an example, the charging module 26 may specifically include a voltage converter, which can convert AC power of the grid into DC power, or convert high-voltage AC power of the grid into low-voltage AC power, and then use the converted electrical energy to charge the battery. It should be noted that, in addition to the voltage converter, the charging module 26 can also be implemented as other devices that can use the electrical energy of the grid to charge the power battery, which is not specifically limited. In some embodiments, the second BMU 23 may manage the charging module 26 through CAN communication. For example, the second BMU 23 can manage eight charging modules 26 at the same time.

After the overall introduction of the scenario for battery swapping and the charging system, the following parts of the embodiments of the present application will sequentially describe in detail the charging method and system for the power battery, the device and the medium of the embodiments of the present application in conjunction with the accompanying drawings. It should be noted that these embodiments are not used to limit the scope of the disclosure of the present application.

Figure 3:
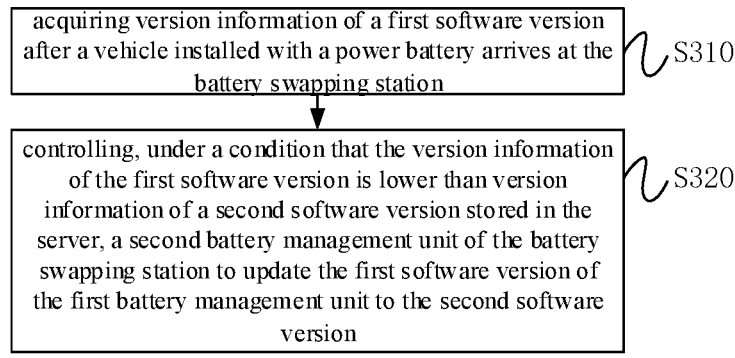
FIG. 3 is a schematic flowchart of a first charging method for a power battery provided by an embodiment of the present application.

FIG. 3 is a schematic flowchart of a first charging method for a power battery provided by an embodiment of the present application. As shown in FIG. 3, the charging method for the power battery may include S310 and S320. In some embodiments, the execution body of each step of the charging method for the power battery may be the server of the battery swapping station.

S310: acquiring version information of a first software version after a vehicle installed with a power battery arrives at the battery swapping station.

Firstly, for the first software version, the first software version is a software version of a first battery management unit of the power battery. In some embodiments, the first software version may be the latest software version of the battery management unit, or may be a historical software version, which is not specifically limited.

Secondly, for acquiring the version information of the first software version, it will be explained in detail through a number of embodiments.

In a first embodiment, the version information of the first software version may be obtained by the second BMU 23 from the first BMU 22 during the communication between the second BMU 23 and the first BMU 22, and then transmitted to the server of the battery swapping station.

Figure 4:
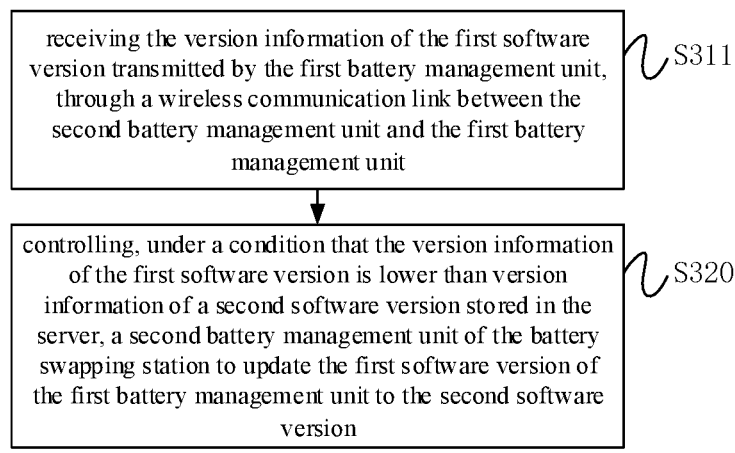
FIG. 4 is a schematic flowchart of a second charging method for a power battery provided by an embodiment of the present application.

Correspondingly, FIG. 4 is a schematic flowchart of a second charging method for a power battery provided by an embodiment of the present application. The difference between FIG. 4 and FIG. 3 is that S310 may specifically include S311.

S311: receiving the version information of the first software version transmitted by the first battery management unit, through a wireless communication link between the second battery management unit and the first battery management unit.

Firstly, for the wireless communication link, in some embodiments, the wireless communication link may be established by the second BMU based on a physical address of the first BMU. Here, the physical address of the first BMU may be a media access control (Media Access Control, MAC) address of the first BMU. Here, the physical addresses of the first BMUs of different power batteries are different. In some embodiments, the wireless communication link may be a communication link of a Bluetooth connection. It should be noted that the wireless communication link may also be a wireless communication link such as wireless fidelity (Wireless Fidelity, Wi-Fi), which is not specifically limited.

Secondly, the way of acquiring the physical address of the first BMU is described below.

In a first example, after removing the power battery by a battery swapping device of the battery swapping station, the physical address can be directly read by an information reading device from an information storage device disposed inside or on the housing of the first BMU. In a specific example, for the specific types of the information storage device and the information reading device, the information storage device may be a device with a function of storing information and a function of being read by the information reading device. For example, the information storage device may be a radio frequency identification (Radio Frequency Identification, RFID) tag, and correspondingly, the information reading device may be an RFID reader. It should be noted that the information storage device and the information reading device may also be other corollary equipment with the functions of reading information and being read, such as a chip, which is not specifically limited. In a specific example, for the way of using the information reading device, the information reading device can be installed on a battery transportation device, so that the information reading device can read the physical address during the transportation of the power battery to the battery swapping cabinet. Exemplarily, the information reading device may be disposed on a stacker. After the battery swapping device places the removed power battery on the stacker, the information reading device can read the physical address of the power battery. Alternatively, after the vehicle arrives at a designated area, the physical address may be acquired by the information reading device. For example, the information reading device can be installed at the entrance of the battery swapping station, or the physical address can be read by the information reading device after the vehicle arrives at the designated battery swapping area.

It should be noted that when the physical address is read at the entrance or the designated battery swapping area, the charging method provided in the embodiments of the present application can be performed before or in synchronization with the battery swapping process, which further improves the charging efficiency.

In a second example, in order to improve the security of information, the server of the battery swapping station may acquire the identification information of the first BMU or the identification information of the power battery from the information storage device through the information reading device. Then, the server of the battery swapping station may obtain the physical address corresponding to the acquired identification information by querying a preset correspondence relationship between the identification information and the physical address, and then transmit the physical address to the second BMU. Here, the specific content of the information reading device can refer to the relevant description of the above embodiments of the present application, which will not be repeated here. In a specific example, the identification information of the power battery may include a battery pack number (Pack Number, PN) code.

According to this example, the information in the information reading device is prevented from being maliciously read to cause information leakage of the vehicle or the battery, thereby improving the information security of the vehicle and the battery pack.

In a third example, in order to improve the security of information, the server of the battery swapping station may acquire the identification information such as the identification information of the vehicle, the identification information of the first BMU, or the identification information of the power battery from the information storage device through the information reading device. Then, the server of the battery swapping station may transmit the acquired identification information to the cloud server. The cloud server may obtain the physical address corresponding to the acquired identification information by querying a preset correspondence relationship between the identification information and the physical address, and then transmit the information of the physical address to the second BMU via the server of the battery swapping station.

According to this example, the information in the information reading device is prevented from being maliciously read to cause information leakage of the vehicle or the battery, thereby improving the information security of the vehicle and the battery pack.

In a specific example, in order to further improve the security of information, after the identification information is transmitted by the server of the battery swapping station to the cloud server, the cloud server may verify the power battery according to the identification information of the power battery or the first BMU. After the verification is passed, the physical address of the first BMU is returned to the cloud server.

According to this example, under a conditions that a large number of batteries are constantly flowing between the battery swapping stations, the cloud server will transmit the physical address of the first BMU to the second BMU only after the cloud server verifies the first BMU. Further, the second BMU establishes a wireless communication connection between the second BMU and the first BMU based on the physical address. Therefore, it is possible to prevent losses and safety hazards caused by using a low-quality battery to exchange for a high-quality battery of the battery swapping station.

In a fourth example, the server of the battery swapping station may acquire license plate information of the vehicle through an image acquisition device after the vehicle arrives at the designated area. Then, the cloud server or the server of the battery swapping station may determine the physical address of the first BMU based on a preset binding relationship of the license plate information and the physical address of the first BMU. Here, the image acquisition device may be a device or module with an image acquisition function, such as a photographic device, a monitor, and a camera.

In a specific example, after the replacement of the battery of the vehicle is completed, in the binding relationship, the correspondence relationship between the vehicle and the physical address of the first BMU of the removed power battery may be replaced with the correspondence relationship of the vehicle and the physical address of the first BMU of the installed power battery.

According to this example, under a condition that the user bypasses the battery swapping station and replaces the battery privately, for example, under a condition that the user changes a battery A of the vehicle to a battery B privately, when the user needs to continue to replace the battery in the battery swapping station, the physical address of the first BMU of the battery A will be returned according to the above binding relationship. After acquiring the physical address, the second BMU cannot establish a wireless communication connection between the second BMU and the first BMU of the battery B of the vehicle, thereby ensuring the reliability of the battery.

In a fifth example, the third BMU in the vehicle body may acquire the physical address of the first BMU of the power battery installed in the vehicle. After the vehicle arrives at the battery swapping station, a wireless communication link is established between the third BMU and the server of the battery swapping station, and then the third BMU may transmit the physical address of the first BMU to the server of the battery swapping station through the wireless communication link.

According to this example, after the third BMU establishes the wireless communication link between the third BMU and the server of the battery swapping station, the charging method provided in the embodiments of the present application can be performed, so that the software update of the battery can be started before the battery is put into the compartment. Compared with the solution that the software update is started after the battery is put into the charging compartment, the charging efficiency may be improved. In a specific scenario for battery swapping, the software update of the first BMU of the power battery can be completed during the disassembly and transportation of the power battery, that is, the software update can be completed before the battery is put into the charging compartment, which improves the charging efficiency.

In a sixth example, the vehicle may transmit a battery swapping request to the cloud server, and the battery swapping request may include the identification information of the vehicle, the identification information of the power battery, or the information of the physical address of the first BMU of the power battery, and the like. Under a condition that the battery swapping request includes the identification information of the vehicle or the identification information of the power battery, the cloud server may query the physical address of the first BMU of the power battery based on the identification information, and then transmit the physical address to the server of the battery swapping station. Alternatively, under a condition that the battery swapping request includes the physical address of the first BMU of the power battery, the cloud server may transmit it to the server of the battery swapping station.

According to one or more of the above examples, in some practical scenarios, under a condition that the update of the power battery is started before the power battery is put into the compartment, that is, the update starts earlier than the time when the power battery is put into the charging compartment, the charging time may be further shortened, and the charging efficiency may be improved.

Secondly, for the specific implementation of S311, the second BMU may obtain the version information of the first software version through the wireless communication link, and then transmit the version information of the first software version to the sever. In some embodiments, the version information of the first software version may be reported by the first BMU to the second BMU after three times handshake, or may be transmitted by the first BMU to the second BMU based on the request of the second BMU.

In a second embodiment, the version information of the first software version may be obtained by the information reading device from the information storage device. Here, the specific content of the information reading device and the information storage device can refer to the above description of the embodiments of the present application, which will not be repeated here.

In a third embodiment, the information reading device may read the identification information of the vehicle, the power battery, or the first BMU from the information storage device. Then, the version information of the first software version corresponding to the identification information may be acquired based on the preset binding relationship in the server of the battery swapping station or the cloud server by using the identification information.

In a fourth embodiment, after a wireless communication link is established between the third BMU and the server of the battery swapping station, the version information of the first software version may be transmitted by the third BMU to the server of the battery swapping station through the wireless communication link.

In a fifth embodiment, the version information of the first software version may be directly obtained by the cloud server from the battery swapping request of the vehicle, or may be obtained according to the identification information of the vehicle, the power battery, or the first BMU in the battery swapping request.

It should be noted that the embodiments of the present application may also obtain the version information of the first software version in other ways, which is not specifically limited in the present application.

After introducing the specific content of the first software version in detail, next, the following parts of the embodiments of the present application will describe the software update process in detail.

S320: controlling, under a condition that the version information of the first software version is lower than version information of a second software version stored in the server of the battery swapping station, the second BMU of the battery swapping station to update the first software version of the first BMU to the second software version, so as to charge the power battery based on the second software version.

Firstly, for the second software version, the second software version may be a software version that is expected to be used to update the power battery. For example, the second software version may be the latest software version, or the software version with the least number of bugs, or the software version with the highest security and the like, which are not specifically limited.

Secondly, for the specific implementation of S320, in some embodiments, the data packets of the second software version may be transmitted to the second BMU, so that the second BMU updates the first BMU based on the data packets. In some examples, the data packets of the second software version can be distributed to each second BMU in advance. For example, after the second software version of the battery swapping controller is updated, the data packets of the updated second software version can be transmitted to each second BMU. In other examples, after determining that the version information of the first software version is lower than the version information of the second software version, the data packets of the second software version may be transmitted to the second BMU.

Figure 5:
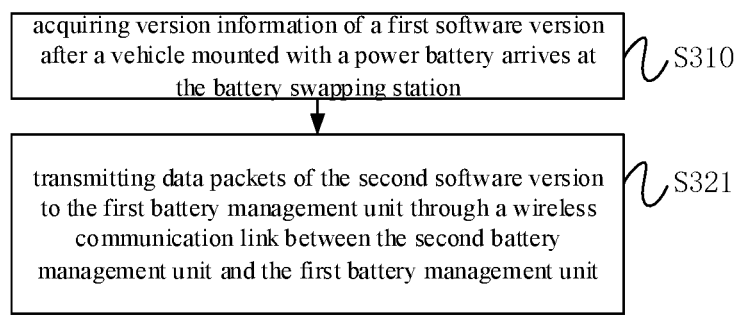
FIG. 5 is a schematic flowchart of a third charging method for a power battery provided by an embodiment of the present application.

In addition, for the software update mode of the second BMU to the first BMU, FIG. 5 is a schematic flowchart of a third charging method for a power battery provided by an embodiment of the present application. The difference between FIG. 5 and FIG. 3 is that S320 may specifically include S321.

S321: transmitting the data packets of the second software version to the first BMU through the wireless communication link between the second BMU and the first BMU, so as to update the first software version of the first battery management unit to the second software version. In other words, the server of the battery swapping station may transmit the data packets of the second software version to the second BMU, and then the second BMU may transmit the data packets of the second software version to the first BMU through the wireless communication link.

In an example, the wireless communication link may be a Bluetooth communication link. The specific content of the wireless communication link can refer to the relevant content of the above embodiments of the present application, which will not be repeated here.

Compared with the method of updating via a wired connection, the method of updating via the wired connection must start the charging process after the power battery is put into the charging compartment and is plugged with the second BMU. Nevertheless, in this embodiment, according to S321, the second BMU can update the first BMU based on wireless communication, and the update can be started before the power battery is put into the charging compartment. The time for wired plugging is saved, and the charging efficiency is improved.

In another example, the second BMU may also update the first BMU via a wired connection, which is not specifically limited in the embodiments of the present application.

According to the charging method for the power battery provided in the embodiments of the present application, after the vehicle installed with the power battery arrives at the battery swapping station, and under a condition that the version information of the first software version of the first battery management unit of the power battery is lower than the second software version stored in the server, the server of the battery swapping station can update the first software version of the first battery management unit to the second software version and then charge the power battery. Further, according to the embodiments of the present application, the first software version can be updated to the second software version before charging, which avoids the problem of long charging time caused by the need to suspend the charging process for version update when the software version is too low during charging. Therefore, the charging efficiency of the power battery is improved, and the user experience is improved.

In addition, at the present stage, since a large number of power batteries will be transferred between different battery swapping stations in the battery swapping technology, it is difficult to update the software version of the first BMU of each power battery to the same version. In the embodiments of the present application, after the power battery is put into the battery swapping station, the version of the power battery can be updated to the second software version through the server of the battery swapping station, which realizes the unification of the software version of the first BMU of each power battery.

After the overall introduction of the charging method for the power battery provided by the embodiments of the present application, the software version of the first BMU is continuously updated over time and according to requirements. In some embodiments, in order to ensure the compatibility of the updated software version of the power battery and other factors, in a specific scenario for battery swapping, the data packets of the second software version in the server of the battery swapping station need to be flexibly updated according to requirements. Next, the present application will describe in detail the process of replacing the data packets of the second software version in the server of the battery swapping station through four embodiments.

Figure 6:
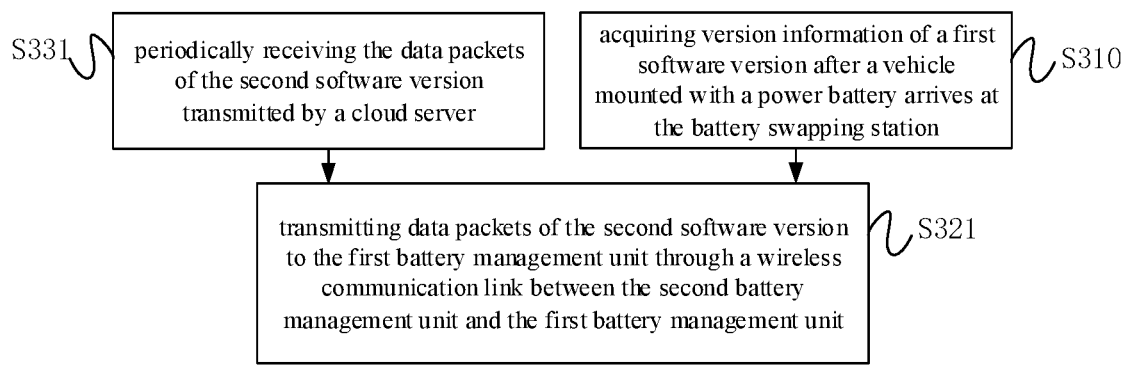
FIG. 6 is a schematic flowchart of a fourth charging method for a power battery provided by an embodiment of the present application.

In a first embodiment, FIG. 6 is a schematic flowchart of a fourth charging method for a power battery provided by an embodiment of the present application. The difference between FIG. 6 and FIG. 5 is that the charging method for the power battery may further include S331.

S331: periodically receiving the data packets of the second software version transmitted by the cloud server.

In an example, the cloud server may actively transmit the data packets of the second software version to the server of the battery swapping station every preset time interval. For example, under a condition that the second software version is the latest version, the cloud server can determine the existing latest software version every preset time interval, and then transmit the data packets of the existing latest software version to the server of the battery swapping station. Here, the preset time interval can be set according to actual scenarios or specific requirements, for example, it can be several days or one month.

In another example, the server of the battery swapping station may transmit the request information for the second software version to the cloud server after a preset time interval. In response to the request information, the cloud server may return the data packets of the second software version to the server of the battery swapping station.

Figure 7:
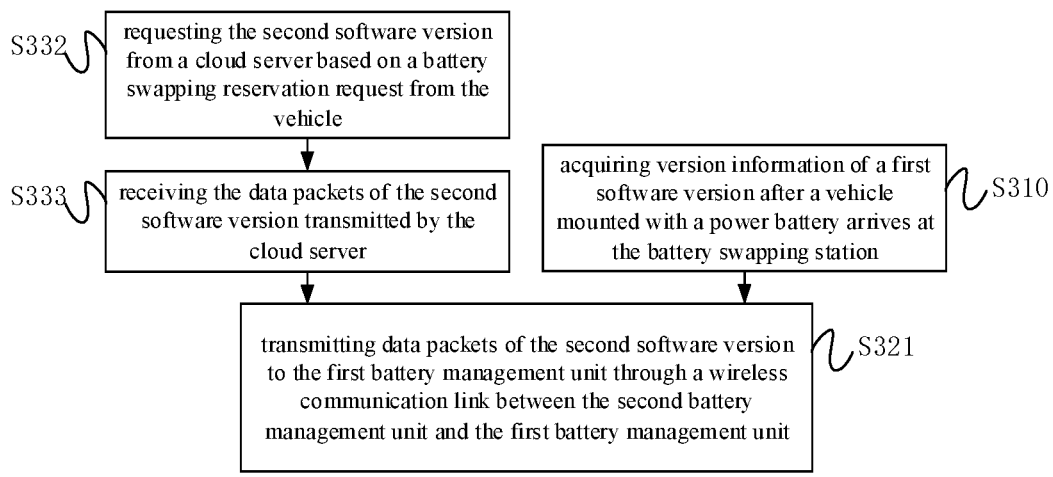
FIG. 7 is a schematic flowchart of a fifth charging method for a power battery provided by an embodiment of the present application.

In the second embodiment, FIG. 7 is a schematic flowchart of a fifth charging method for a power battery provided in an embodiment of the present application. The difference between FIG. 7 and FIG. 5 is that the charging method for the power battery may further include S332 and S333.

S332: requesting the second software version from the cloud server based on a battery swapping reservation request from the vehicle.

In an example, the server of the battery swapping station may request the second software version from the cloud server every time it receives the battery swapping reservation request from the vehicle.

In another example, the server of the battery swapping station may request the second software version from the cloud server when the version information of the first software version is higher than the version information of the second software version.

In an actual scenario, due to some reasons (for example, a vehicle is just rolled off the assembly line, the first software version of the first BMU is updated on the same day, and then the vehicle comes to replace the battery immediately after registration; however, at the same time, the upgrade package for the first BMU is just released to the cloud server), the server of the battery swapping station may not update the second software version in time. After the vehicle arrives at the battery swapping station, the server of the battery swapping station determines that the version information of the first software version is higher than the version information of the second software version. Therefore, the server of the battery swapping station may request the second software version from the cloud server.

S333: receiving the data packets of the second software version transmitted by the cloud server.

In a third embodiment, in order to ensure that the second software version in the battery swapping station will be updated in time, the battery swapping method for the power battery further includes step A1.

Step A1: after the second software version on the cloud server is updated, the second software version in the battery swapping station can be updated synchronously.

In a fourth embodiment, in order to further improve the charging efficiency, the power battery replacement method further includes steps A2 and A3.

Step A2: the cloud server receives the battery swapping reservation request of the vehicle and the second software version transmitted by the server of the battery swapping station. Here, the battery swapping reservation request includes the version information of the first software version of the first BMU of the power battery of the vehicle.

Step A3: under a condition that the version information of the first software version is lower than the version information of the second software version transmitted by the cloud server, and the version information of the second software version stored in the server of the battery swapping station is lower than the version information of the second software version in the cloud server, the cloud server transmits the data packets of the second software version to the server of the battery swapping station.

It should be noted that the server of the battery swapping station might further update the stored second software version in other ways, which is not specifically limited.

In addition, in some embodiments, after acquiring the data packets of the second software version transmitted by the cloud server, the server of the battery swapping station will replace the original data packets of the second software version with the newly received data packets of the second software version. Exemplarily, under a condition that the data packets of version A are originally stored in the server of the battery swapping station, after the cloud server transmits the data packets of version B to the server of the battery swapping station, the server of the battery swapping station will use version B as the new second software version.

Figure 8:
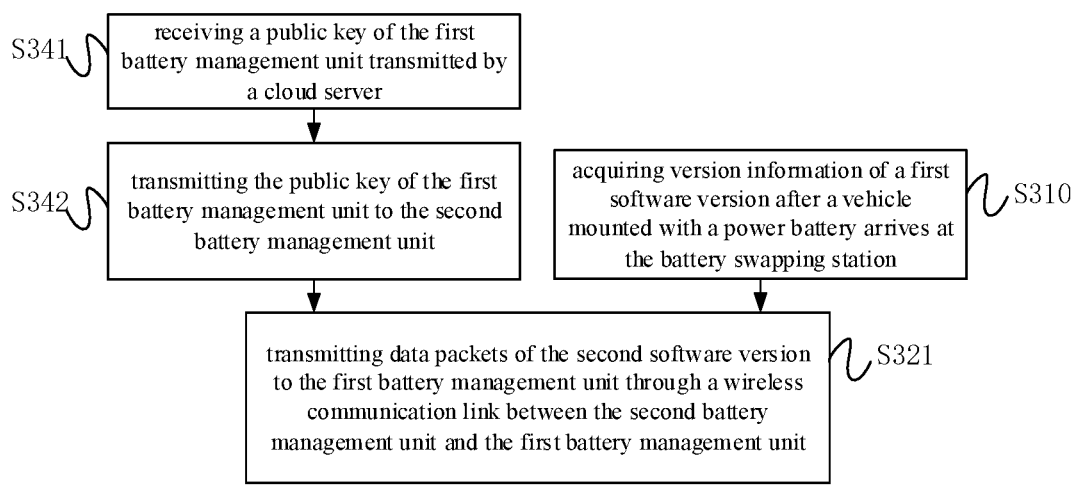
FIG. 8 is a schematic flowchart of a sixth charging method for a power battery provided by an embodiment of the present application.

In some embodiments, in order to improve the security of the software update process, FIG. 8 is a schematic flowchart of a sixth charging method for a power battery provided in an embodiment of the present application. The difference between FIG. 8 and FIG. 5 is that the charging method for the power battery further includes S341 and S342.

S341: receiving a public key of the first BMU transmitted by the cloud server.

In some embodiments, the cloud server may transmit the public key of the first BMU of the trusted battery to the trusted battery swapping station.

S342: transmitting the public key of the first battery management unit to the second battery management unit, for encrypting the data packets of the second software version by the second battery management unit using a pre-stored private key of the battery swapping station and the public key of the first battery management unit, thereby obtaining ciphertext data; and transmitting the ciphertext data to the first battery management unit, for decrypting the ciphertext data by the first battery management unit based on a public key of the battery swapping station and a private key of the first battery management unit, thereby obtaining the data packets.

In some embodiments, the data packets may be encrypted using the public key of the first BMU to obtain a digital signature, and then the digital signature may be re-encrypted using the private key of the battery swapping station to obtain the ciphertext data to be transmitted.

Correspondingly, after the ciphertext data is transmitted to the first BMU, the ciphertext data can be sequentially decrypted using the public key of the battery swapping station and the private key of the first BMU to obtain the data packets.

It should be noted that, according to this embodiment, the security of the transmission process of the data packets can be guaranteed, and the encrypted data packets may be prevented from being illegally obtained. In addition, because the cloud server will exchange the secret keys between the trusted battery swapping station and the trusted power battery, the untrusted battery may be prevented from being updated in the battery swapping station, and the untrusted battery swapping station may be prevented from updating the trusted power battery. Therefore, the occurrence of abnormal phenomenas such as unauthorized battery swapping may be prevented, and the reliability of the battery swapping process may be improved.

In an example, the encryption algorithm in the embodiments of the present application may be a symmetric encryption algorithm or an asymmetric encryption algorithm, which is not specifically limited. For example, the encryption algorithm may be a hash algorithm.

Figure 9:
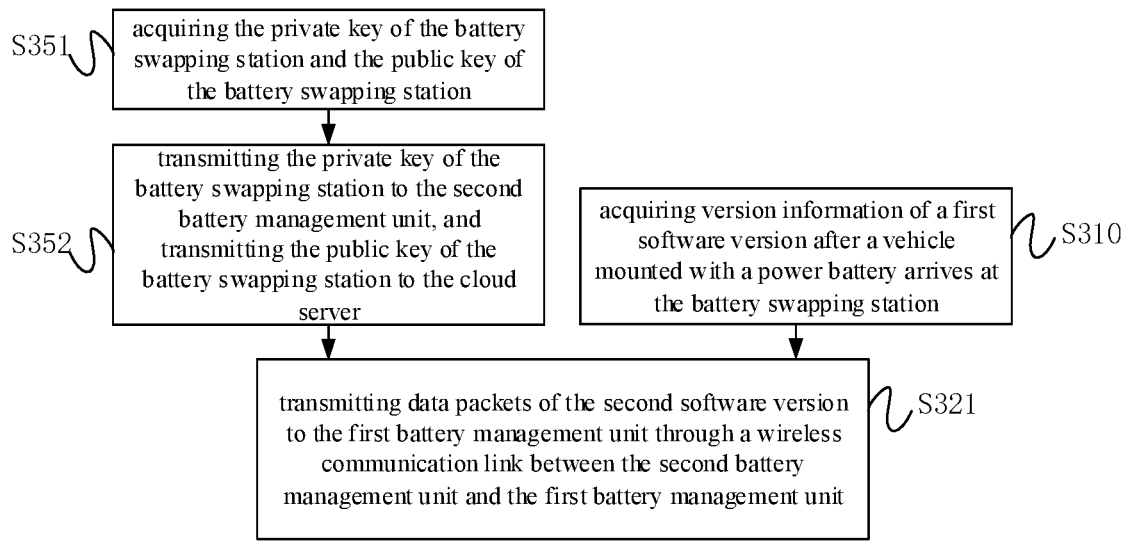
FIG. 9 is a schematic flowchart of a seventh charging method for a power battery provided by an embodiment of the present application.

In some embodiments, in order to improve the security of the software update process, FIG. 9 is a schematic flowchart of a seventh charging method for a power battery provided in an embodiment of the present application. The difference between FIG. 9 and FIG. 5 is that the charging method for the power battery further includes S351 and S352.

S351: acquiring the private key of the battery swapping station and the public key of the battery swapping station.

S352: transmitting the private key of the battery swapping station to the second BMU, and transmitting the public key of the battery swapping station to the cloud server, for distributing the public key of the battery swapping station by the cloud server to the power battery.

According to the embodiments of the present application, the public key of the battery swapping station can be distributed to the trusted power battery, which ensures the reliability of the entire battery swapping process. Therefore, after the trusted power battery receives the ciphertext data forged by the illegal battery swapping station, under a condition that the forged ciphertext data cannot be decrypted using the public key of the battery swapping station, the software update process can be suspended and the reliability of the battery swapping process can be improved.

After the software update process is described in detail according to the above embodiments, the charging process after the software update will be described in detail below.

Figure 10:
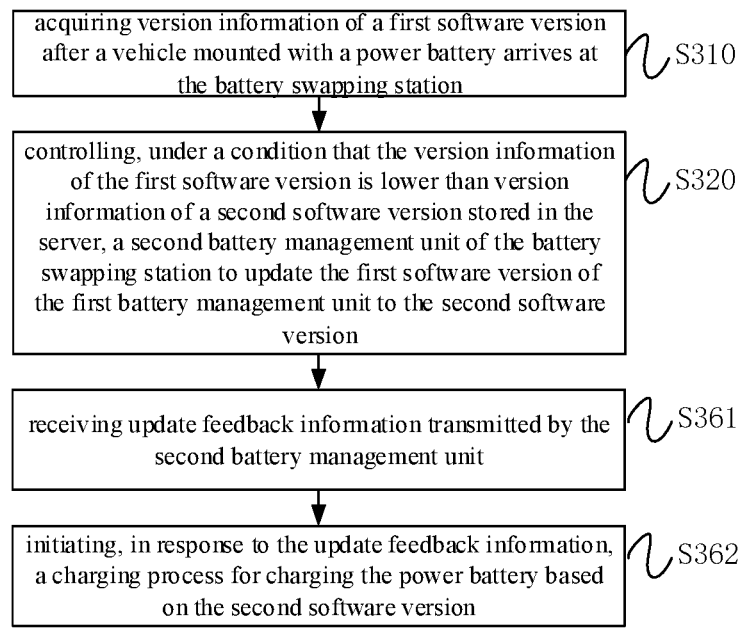
FIG. 10 is a schematic flowchart of an eighth charging method for a power battery provided by an embodiment of the present application.

In some embodiments, FIG. 10 is a schematic flowchart of an eighth charging method for a power battery provided in an embodiment of the present application. The difference between FIG. 10 and FIG. 3 is that the charging method for the power battery further includes S361 and S362.

S361: receiving update feedback information transmitted by the second BMU, wherein the update feedback information indicates that the first BMU has updated the first software version to the second software version.

In an example, after the first BMU is updated based on the data packets, the first BMU will transmit the update feedback information to the second BMU. After receiving the update feedback information, the second BMU will transmit the update feedback information to the server of the battery swapping station.

S362: initiating, in response to the update feedback information, a charging process for charging the power battery based on the second software version.

In an example, the server of the battery swapping station may transmit an instruction to start the software update to the second BMU. Based on the instruction, the second BMU charges the power battery by controlling the charging device.

Based on the same application concept, in addition to providing the charging method for the power battery, the embodiments of the present application also provide a corresponding charging device for a power battery.

The charging device for the power battery according to the embodiments of the present application will be described in detail in the followings with reference to the drawings.

Figure 11:
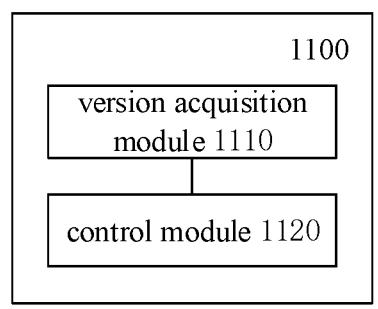
FIG. 11 is a schematic diagram of a structure of a charging device for a power battery provided by an embodiment of the present application.

FIG. 11 is a schematic diagram of a structure of a charging device for a power battery provided by an embodiment of the present application. As shown in FIG. 11, the charging device 1100 for the power battery includes a version acquisition module 1110 and a control module 1120.

The version acquisition module 1110 is configured to acquire version information of a first software version after a vehicle mounted with a power battery arrives at the battery swapping station, wherein the first software version is a software version of a first battery management unit of the power battery;

The control module 1120 is configured to control, under a condition that the version information of the first software version is lower than version information of a second software version stored in the server, a second battery management unit of the battery swapping station to update the first software version of the first battery management unit to the second software version, so as to charge the power battery based on the second software version.

In some embodiments, the version acquisition module 1110 is specifically configured to:
receive the version information of the first software version transmitted by the first battery management unit, through a wireless communication link between the second battery management unit and the first battery management unit.

In some embodiments, the control module 1120 is specifically configured to:
transmit data packets of the second software version to the first battery management unit through a wireless communication link between the second battery management unit and the first battery management unit, so as to update the first software version of the first battery management unit to the second software version.

In some embodiments, the charging device 1100 for the power battery further includes:
an information reception module configured to receive update feedback information transmitted by the second battery management unit, wherein the update feedback information indicates that the first battery management unit has updated the first software version to the second software version;
a charging initiation module configured to initiate, in response to the update feedback information, a charging process for charging the power battery based on the second software version.

In some embodiments, the charging device 1100 for the power battery further includes:
a data packet receiving module configured to periodically receive the data packets of the second software version transmitted by a cloud server.

In some embodiments, the charging device 1100 for the power battery further includes:
a version request module configured to request the second software version from a cloud server based on a battery swapping reservation request from the vehicle;
a data packet receiving module configured to receive the data packets of the second software version transmitted by the cloud server.

In some embodiments, the charging device 1100 for the power battery further includes:
a secret key acquisition module configured to receive a public key of the first battery management unit transmitted by a cloud server;
a secret key transmission module configured to: transmit the public key of the first battery management unit to the second battery management unit, for encrypting the data packets of the second software version by the second battery management unit using a pre-stored private key of the battery swapping station and the public key of the first battery management unit, thereby obtaining ciphertext data; and transmit the ciphertext data to the first battery management unit, for decrypting the ciphertext data by the first battery management unit based on a public key of the battery swapping station and a private key of the first battery management unit, thereby obtaining the data packets.

In some embodiments, the charging device 1100 for the power battery further includes:
a secret key acquisition module configured to acquire the private key of the battery swapping station and the public key of the battery swapping station;
a secret key transmission module configured to transmit the private key of the battery swapping station to the second battery management unit, and transmit the public key of the battery swapping station to the cloud server, for distributing the public key of the battery swapping station by the cloud server to the power battery.

The other details of the charging device for the power battery according to the embodiments of the present application are similar to the charging method for the power battery described above in conjunction with the examples shown in FIGS. 3-10, and can achieve the corresponding technical effects, which are not repeated here for the sake of brevity.

Figure 12:
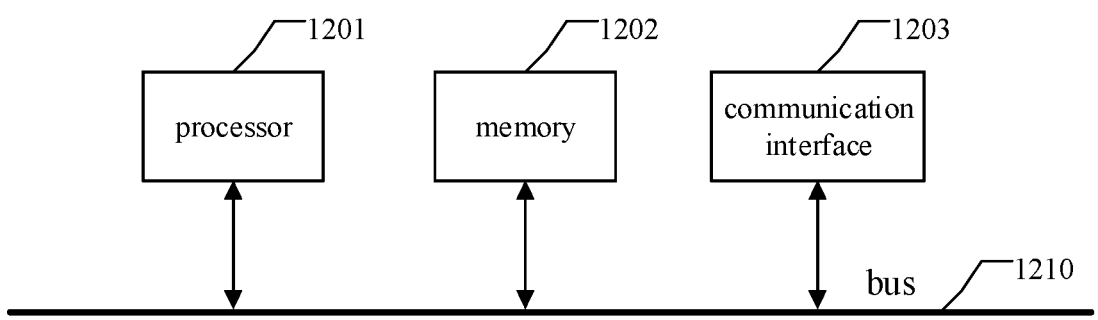
FIG. 12 illustrates a schematic diagram of a hardware structure of a charging device for a power battery provided by an embodiment of the present application.

FIG. 12 illustrates a schematic diagram of a hardware structure of a charging device for a power battery provided by an embodiment of the present application.

The charging device for the power battery may include a processor 1201 and a memory 1202 storing computer program instructions.

Specifically, the foregoing processor 1201 may include a central processing unit (Central Processing Unit, CPU) or an application specific integrated circuit (Application Specific Integrated Circuit, ASIC), or may be configured as one or more integrated circuits implementing the embodiments of the present application.

The memory 1202 may include a large-capacity memory for data or instructions. For example and without limitation, the memory 1202 may include a hard disk drive (Hard Disk Drive, HDD), a floppy disk drive, a flash memory, an optical disk, a magneto-optical disk, a magnetic tape, or a universal serial bus (Universal Serial Bus, USB) drive, or a combination of two or more thereof. In some examples, the memory 1202 may include a removable or non-removable (or fixed) medium, or the memory 1202 is a non-volatile solid-state memory. In some embodiments, the memory 1202 may be inside or outside the charging device for the power battery.

In some examples, the memory 1202 may be a read only memory (Read Only Memory, ROM). In one example, the ROM may be a mask-programmed ROM, a programmable ROM (PROM), an erasable PROM (EPROM), an electrically erasable PROM (EEPROM), an electrically rewriteable ROM (EAROM), or a flash memory or a combination of two or more thereof.

The memory 1202 may include a read only memory (ROM), a random access memory (RAM), a magnetic disk storage media device, an optical storage media device, a flash memory device, an electrical, optical, or other physical/tangible memory storage device. Therefore, the memory includes one or more tangible (non-transitory) computer-readable storage media (e.g., memory devices) encoded with software including computer-executable instructions, and the software, when executed (e.g., by one or more processors), is operable to perform the operations described with reference to the method according to one aspect of the present disclosure.

The processor 1201 reads and executes the computer program instructions stored in the memory 1202 to implement the methods/steps in the embodiments shown in FIG. 3-10, and achieve the corresponding technical effects of the methods/steps in the embodiments shown in FIG. 3-10, which is not repeated here for the sake of brevity.

In an example, the charging device for the power battery may further include a communication interface 1203 and a bus 1210. Here, as shown in FIG. 12, the processor 1201, the memory 1202, and the communication interface 1203 are connected through the bus 1210 and complete communication with each other.

The communication interface 1203 is mainly configured to implement communication between various modules, apparatuses, units and/or devices in the embodiments of the present application.

The bus 1210 includes hardware, software, or both, and couples the components of the charging device for the power battery to each other. By way of example and without limitation, the bus may include an accelerated graphics port (Accelerated Graphics Port, AGP) or other graphics bus, an enhanced industry standard architecture (Extended Industry Standard Architecture, EISA) bus, a front side bus (Front Side Bus, FSB), a hyper transport (Hyper Transport, HT) interconnection, an industry standard architecture (Industry Standard Architecture, ISA) bus, an unlimited bandwidth interconnection, a low pin count (LPC) bus, a memory bus, a microchannel architecture (MCA) bus, a peripheral component interconnection PCI bus, a PCI-Express (PCI-X) bus, a serial advanced technology attachment (SATA) bus, a video electronics standards association local (VLB) bus or other suitable bus, or a combination of two or more thereof. Where appropriate, the bus 1210 may include one or more buses. Although the embodiments of the present application describe and show a specific bus, the present application considers any suitable bus or interconnect.

The charging device for the power battery may execute the charging method for the power battery in the embodiments of the present application, so as to realize the charging method and device for the power battery described with reference to FIGS. 3-11.

In addition, in conjunction with the charging methods for the power battery in the foregoing embodiments, the embodiments of the present application may provide a computer storage medium for implementation. The computer storage medium stores computer program instructions; the computer program instructions, when executed by the processor, implement any one of the charging methods for the power battery in the foregoing embodiments.

It should be clear that the present application is not limited to the specific configuration and processing described above and shown in the drawings. For the sake of brevity, a detailed description of the known method is omitted here. In the above embodiments, several specific steps are described and shown as examples. Nevertheless, the method of the present application is not limited to the specific steps described and shown, and those skilled in the art can make various changes, modifications and additions, or can change the order between the steps after understanding the spirit of the present application.

The functional blocks shown in the above structural block diagram can be implemented as hardware, software, firmware, or a combination thereof. When implemented in hardware, the functional blocks can be, for example, an electronic circuit, an application specific integrated circuit (Application Specific Integrated Circuit, ASIC), appropriate firmware, a plug-in, a functional card, and so on. When implemented in software, the elements of the present application are programs or code segments used to perform required tasks. The programs or code segments may be stored in a machine-readable medium, or transmitted over a transmission medium or a communication link through a data signal carried in a carrier wave. The "Machine-readable medium" may include any medium that can store or transmit information. Examples of the machine-readable medium include an electronic circuit, a semiconductor memory device, an ROM, a flash memory, an erasable ROM (EROM), a floppy disk, a CD-ROM, an optical disk, a hard disk, an optical fiber medium, a radio frequency (RF) link, etc. The code segments can be downloaded via a computer network such as the Internet, the Intranet, and so on.

It should be noted that the exemplary embodiments mentioned in the present application describe some methods or systems based on a series of steps or devices. However, the present application is not limited to the order of the above steps, that is, the steps may be performed in the order mentioned in the embodiment or in an order different from that in the embodiment, or several steps may be performed at the same time.

Various aspects of the present disclosure are described above with reference to the flowcharts and/or block diagrams of the methods, apparatuses, devices, and computer program products according to the embodiments of the present disclosure. It should be understood that each block in the flowcharts and/or block diagrams and combinations of blocks in the flowcharts and/or block diagrams can be implemented by computer program instructions. These computer program instructions can be provided to a processor of a general-purpose computer, a special-purpose computer, or other programmable data processing devices to produce a machine that enables the implementation of functions/actions specified in one or more blocks of the flowcharts and/or block diagrams by executing these instructions via the processor of the computer or other programmable data processing devices. Such a processor may be, but not limited to, a general purpose processor, a dedicated processor, a special application processor, or a field programmable logic circuit. It can also be understood that each block in the block diagrams and/or flowcharts and combinations of blocks in the block diagrams and/or flowcharts can also be implemented by dedicated hardware that performs the specified functions or actions, or can be implemented by a combination of dedicated hardware and computer instructions.

Described above are merely specific embodiments of the present application. A skilled person in the art can clearly understand that, for the sake of convenience and briefness in description, the specific working processes of the above-described systems, modules and units may refer to the corresponding processes in the embodiments of the aforementioned methods, and details are not described herein again. It should be understood that the protection scope of the present application is not limited thereto. A skilled person in the art can readily conceive various equivalent modifications or replacements within the technical scope disclosed by the present application, and these modifications or replacements shall fall within the protection scope of the present application.

What is claimed is:

1. A charging method for a power battery, wherein the method is applied to a server of a battery swapping station, and the method comprises:
   acquiring version information of a first software version after a vehicle installed with the power battery arrives at the battery swapping station, wherein the first software version is a software version of a first battery management unit of the power battery;
   controlling, under a condition that the version information of the first software version is lower than version information of a second software version stored in the server, a second battery management unit of the battery swapping station to update the first software version of the first battery management unit to the second software version, so as to charge the power battery based on the second software version,
   wherein controlling the second battery management unit of the battery swapping station to update the first software version of the first battery management unit to the second software version specifically comprises:
   transmitting data packets of the second software version to the first battery management unit through a wireless communication link between the second battery management unit and the first battery management unit, so as to update the first software version of the first battery management unit to the second software version,
   wherein the method further comprises:
   receiving a public key of the first battery management unit transmitted by a cloud server;
   transmitting the public key of the first battery management unit to the second battery management unit, for encrypting the data packets of the second software version by the second battery management unit using a pre-stored private key of the battery swapping station and the public key of the first battery management unit, thereby obtaining ciphertext data; and
   transmitting the ciphertext data to the first battery management unit, for decrypting the ciphertext data by the first battery management unit based on a public key of the battery swapping station and a private key of the first battery management unit, thereby obtaining the data packets.

2. The method according to claim 1, wherein acquiring the version information of the first software version of the power battery specifically comprises:
   receiving the version information of the first software version transmitted by the first battery management unit, through the wireless communication link between the second battery management unit and the first battery management unit.

3. The method according to claim 1, wherein after controlling the second battery management unit of the battery swapping station to update the first software version of the first battery management unit to the second software version, the method further comprises:
   receiving update feedback information transmitted by the second battery management unit, wherein the update feedback information indicates that the first battery management unit has updated the first software version to the second software version;
   initiating, in response to the update feedback information, a charging process for charging the power battery based on the second software version.

4. The method according to claim 1, wherein the method further comprises:
   periodically receiving the data packets of the second software version transmitted by the cloud server.

5. The method according to claim 1, wherein the method further comprises:
   requesting the second software version from the cloud server based on a battery swapping reservation request from the vehicle;
   receiving the data packets of the second software version transmitted by the cloud server.

6. The method according to claim 1, wherein the method further comprises:
   acquiring the pre-stored private key of the battery swapping station and the public key of the battery swapping station;
   transmitting the pre-stored private key of the battery swapping station to the second battery management unit, and transmitting the public key of the battery swapping station to the cloud server, for distributing the public key of the battery swapping station by the cloud server to the power battery.

7. A charging device for a power battery, comprising:
   a processor and a memory storing computer program instructions;
   wherein the processor, when reads and executes the computer program instructions, implements operations comprising:
   acquiring version information of a first software version after a vehicle installed with the power battery arrives at a battery swapping station, wherein the first software version is a software version of a first battery management unit of the power battery;
   controlling, under a condition that the version information of the first software version is lower than version information of a second software version stored in a server of the battery swapping station, a second battery management unit of the battery swapping station to update the first software version of the first battery management unit to the second software version, so as to charge the power battery based on the second software version,
   wherein controlling the second battery management unit of the battery swapping station to update the first software version of the first battery management unit to the second software version specifically comprises:
   transmitting data packets of the second software version to the first battery management unit through a wireless communication link between the second battery management unit and the first battery management unit, so as to update the first software version of the first battery management unit to the second software version,
   wherein the operations further comprises:
   receiving a public key of the first battery management unit transmitted by a cloud server;
   transmitting the public key of the first battery management unit to the second battery management unit, for encrypting the data packets of the second software version by the second battery management unit using a pre-stored private key of the battery swapping station and the public key of the first battery management unit, thereby obtaining ciphertext data; and
   transmitting the ciphertext data to the first battery management unit, for decrypting the ciphertext data by the first battery management unit based on a public key of the battery swapping station and a private key of the first battery management unit, thereby obtaining the data packets.

8. The device according to claim 7, wherein acquiring the version information of the first software version of the power battery specifically comprises:
receiving the version information of the first software version transmitted by the first battery management unit, through the wireless communication link between the second battery management unit and the first battery management unit.

9. The device according to claim 7, wherein after controlling the second battery management unit of the battery swapping station to update the first software version of the first battery management unit to the second software version, the operations further comprise:
receiving update feedback information transmitted by the second battery management unit, wherein the update feedback information indicates that the first battery management unit has updated the first software version to the second software version;
initiating, in response to the update feedback information, a charging process for charging the power battery based on the second software version.

10. The device according to claim 7, wherein the operations further comprise:
periodically receiving the data packets of the second software version transmitted by the cloud server.

11. The device according to claim 7, wherein the operations further comprise:
requesting the second software version from the cloud server based on a battery swapping reservation request from the vehicle;
receiving the data packets of the second software version transmitted by the cloud server.

12. The device according to claim 7, wherein the operations further comprise:
acquiring the pre-stored private key of the battery swapping station and the public key of the battery swapping station;
transmitting the pre-stored private key of the battery swapping station to the second battery management unit, and transmitting the public key of the battery swapping station to the cloud server, for distributing the public key of the battery swapping station by the cloud server to the power battery.

13. A non-transitory computer-readable storage media having computer program instructions stored thereon, wherein the computer program instructions, when executed by a processor, implement operations comprising:
acquiring version information of a first software version after a vehicle installed with a power battery arrives at a battery swapping station, wherein the first software version is a software version of a first battery management unit of the power battery;
controlling, under a condition that the version information of the first software version is lower than version information of a second software version stored in a server of the battery swapping station, a second battery management unit of the battery swapping station to update the first software version of the first battery management unit to the second software version, so as to charge the power battery based on the second software version,
wherein controlling the second battery management unit of the battery swapping station to update the first software version of the first battery management unit to the second software version specifically comprises:
transmitting data packets of the second software version to the first battery management unit through a wireless communication link between the second battery management unit and the first battery management unit, so as to update the first software version of the first battery management unit to the second software version,
wherein the operations further comprises:
receiving a public key of the first battery management unit transmitted by a cloud server;
transmitting the public key of the first battery management unit to the second battery management unit, for encrypting the data packets of the second software version by the second battery management unit using a pre-stored private key of the battery swapping station and the public key of the first battery management unit, thereby obtaining ciphertext data; and
transmitting the ciphertext data to the first battery management unit, for decrypting the ciphertext data by the first battery management unit based on a public key of the battery swapping station and a private key of the first battery management unit, thereby obtaining the data packets.

14. The non-transitory computer-readable storage media according to claim 13, wherein acquiring the version information of the first software version of the power battery specifically comprises:
receiving the version information of the first software version transmitted by the first battery management unit, through the wireless communication link between the second battery management unit and the first battery management unit.

15. The non-transitory computer-readable storage media according to claim 13, wherein after controlling the second battery management unit of the battery swapping station to update the first software version of the first battery management unit to the second software version, the operations further comprise:
receiving update feedback information transmitted by the second battery management unit, wherein the update feedback information indicates that the first battery management unit has updated the first software version to the second software version;
initiating, in response to the update feedback information, a charging process for charging the power battery based on the second software version.

16. The non-transitory computer-readable storage media according to claim 13, wherein the operations further comprise:
periodically receiving the data packets of the second software version transmitted by the cloud server.

17. The non-transitory computer-readable storage media according to claim 13, wherein the operations further comprise:
requesting the second software version from the cloud server based on a battery swapping reservation request from the vehicle;
receiving the data packets of the second software version transmitted by the cloud server.

18. The non-transitory computer-readable storage media according to claim 13, wherein the operations further comprise:
acquiring the pre-stored private key of the battery swapping station and the public key of the battery swapping station;

transmitting the pre-stored private key of the battery swapping station to the second battery management unit, and transmitting the public key of the battery swapping station to the cloud server, for distributing the public key of the battery swapping station by the cloud server to the power battery.

\* \* \* \* \*